June 25, 1968     D. R. SKOYLES     3,389,939
ANTI-LOCK APPARATUS FOR VEHICLE BRAKES
Original Filed April 19, 1965     7 Sheets-Sheet 1

INVENTOR.
DEREK ROBERT SKOYLES
BY
AGENT

June 25, 1968  D. R. SKOYLES  3,389,939
ANTI-LOCK APPARATUS FOR VEHICLE BRAKES
Original Filed April 19, 1965  7 Sheets-Sheet 2

BY DEREK ROBERT SKOYLES

*Frank R. Sufani*

AGENT

June 25, 1968     D. R. SKOYLES     3,389,939
ANTI-LOCK APPARATUS FOR VEHICLE BRAKES
Original Filed April 19, 1965     7 Sheets-Sheet 4

INVENTOR.
DEREK ROBERT SKOYLES
BY
Frank R. Trifari
AGENT

INVENTOR.
DEREK ROBERT SKOYLES

June 25, 1968   D. R. SKOYLES   3,389,939
ANTI-LOCK APPARATUS FOR VEHICLE BRAKES
Original Filed April 19, 1965   7 Sheets-Sheet 6

INVENTOR.
DEREK ROBERT SKOYLES

United States Patent Office 3,389,939
Patented June 25, 1968

3,389,939
ANTI-LOCK APPARATUS FOR
VEHICLE BRAKES
Derek R. Skoyles, East Grinstead, England, assignor to North American Philips Company, Inc., New York, N.Y., a corporation of Delaware
Continuation of application Ser. No. 449,216, Apr. 19, 1965. This application Aug. 30, 1967, Ser. No. 667,041
Claims priority, application Great Britain, Apr. 21, 1964, 16,474/64; July 30, 1964, 30,214/64
22 Claims. (Cl. 303—21)

ABSTRACT OF THE DISCLOSURE

An anti-lock apparatus for a vehicle brake system having a control piston interposed in an open fluid passage between a master cylinder and a brake cylinder. When brake-lock is sensed, the control piston is actuated thereby terminating fluid communication between the master cylinder and the brake cylinder. A force balancing mechanism is connected to the master cylinder and the control piston. Energy from the pressurized master cylinder fluid is transmitted to the control piston via the force balancing mechanism to balance the pressure from the master cylinder acting directly on the control piston. Fluid pressure is reduced in the brake cylinder by the action of the control piston thereby causing the brakes to be released.

This application is a continuation of applicant's co-pending application Ser. No. 449,216, filed Apr. 19, 1965, now abandoned.

This invention relates to vehicle brake systems and more particularly to wheeled vehicle braking systems of the anti-lock type. The nature of such systems will first be explained.

Anti-lock braking systems for vehicles are systems designed to improve braking performance by releasing a wheel brake automatically if the wheel tends to lock on a slippery surface and then permitting further braking action without the need for any change in the action of the person using the brake. Such systems can be successful in reducing the risk of skidding due to wheel lock, maintaining directional control and can also reduce braking distances.

Figure 1:
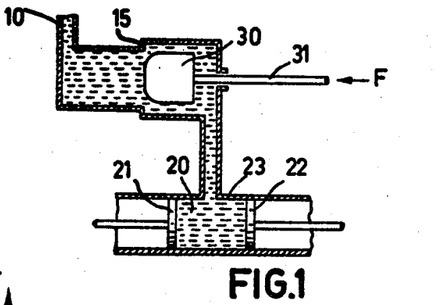
FIGURES 1 to 3 show a simple anti-lock braking system.
Figure 2:
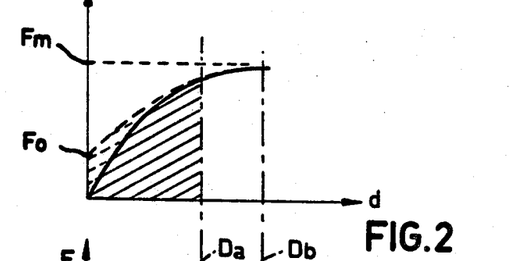
Figure 3:
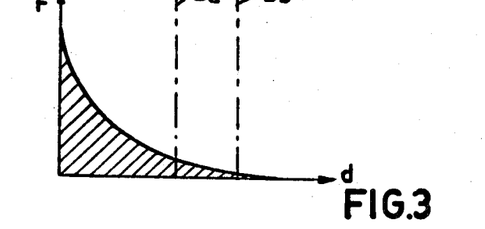

Before describing the invention, it is convenient to give a description of a hydraulic anti-lock braking system shown in FIGURES 1 to 3 by way of introduction. The system of FIGURE 1 comprises a hydraulic pressure fluid line from a master cylinder to a wheel brake controlled by the system, and a control piston inserted in the pressure line and actuated (for example by an electromagnet) by a control rod in response to sensor signals from a wheel deceleration sensor.

This is a direct-acting system in that the piston has to overcome most of the fluid pressure from the master cylinder.

The brake cylinder is shown with two pistons for actuating the two brake shoes of one wheel in a conventional manner. This represents the preferred case in which an individual wheel has its own separate sensor and control element.

In the arrangement and situation illustrated in FIGURE 1 it should be assumed that the brakes are "ON," i.e. are being applied to some unknown extent determined by the force with which the driver is actuating the piston (not shown) in the master cylinder. The latter force will determine the prevailing value of the master cylinder pressure. In these assumed conditions fluid has passed previously from the line to the brake cylinder without being impeded by piston and consequently the same instantaneous prevailing "ON" pressure exists both in the master cylinder line and in the brake cylinder. If this pressure happens to be sufficient to tend to cause locking and skidding of the wheel, release or partial release of the brake is obtained by directly opposing the master cylinder pressure. This is done by a force F which moves the piston to the left.

In FIGURE 2 the curves represent the force F needed to move the piston against the master cylinder pressure plotted against distance $d$ travelled by the piston for a given prevailing master cylinder pressure which exerts a corresponding force $Fm$ on the piston. The force F would be constant (and equal to $Fm$) if it were not for the fact, that, once the piston has entered the restricted bore (which starts at R), an assisting force of changing value acts on its right-hand face (i.e. the face adjacent to the control rod). This force is due to the fact that fluid previously compressed in the brake cylinder (at master cylinder pressure) is now trapped and thus tends to re-expand against the piston. Of course, the resulting initial aiding force has a maximum value at the start of the anti-lock stroke and diminishes gradually as the brake pressure reduces towards "zero" (i.e. atmospheric) pressure when the brake shoes are fully off. This aiding force $(Fw)$ is plotted in FIGURE 3 against the same piston displacements $(d)$ as FIGURE 2. Since the aiding force $Fw$ has its maximum value at the start of the stroke, the force F needed to move the piston will start at a minimum value, and this is shown by the curves of FIGURE 2.

The work done by force F, that is the work provided by the electromagnet, is shown as the shaded area of FIGURE 2 and is quite considerable. Graphically expressed, it is equal to the difference between the rectangle $Fm \times Da$ and the shaded work area shown in FIGURE 3. Also, a substantial amount of fluid is fed back to the master cylinder, and in practice this has the undesirable effect of jerking back the foot of the driver while he is applying the brake.

It is an object of the present invention to provide means for reducing considerably the work required to actuate the control piston.

The invention provides apparatus for use in an anti-lock hydraulic vehicle brake system for transferring stored mechanical energy from one storage element to another by application of a control force to a transfer control element of the apparatus, the first of said storage elements being constituted by the natural resilience of a brake assembly, which arrangement comprises said control element, a force-balancing device coupled to said control element, means for causing forces associated with the energies stored in said storage elements to oppose each other in said force-balancing device, and a control piston hydraulically coupled to said brake assembly which piston is adapted, during application of an anti-lock control force thereto via said control element, to tend to release said brake assembly, the second storage element being adapted to develop a force which is fed back to said control element via the force-balancing device in a positive manner such as to reduce the necessary control force.

The term "force-balancing" should not be interpreted narrowly as implying complete balance. In fact, although the invention includes arrangements wherein the forces in the force-balancing device (apart from the control force) are fully balanced it also includes arrangements wherein the forces in the force-balancing device (apart from the control force) are incompletely balanced in such manner as to tend to restore the control element to its original position.

The apparatus may be regarded as one in which energy is supplied to a first energy store of the brake cylinder and means are used for diverting energy from said first store temporarily to another store prior to returning it to the original store of the master cylinder.

The apparatus may employ a master cylinder as a source of pressurized fluid, and the force-balancing device may be a non-linear mechanical device connected between the control element and the second storage element. The embodiments described below incorporate these two features and differ largely with respect to the choice of means to serve as the second storage element.

Figure 4:
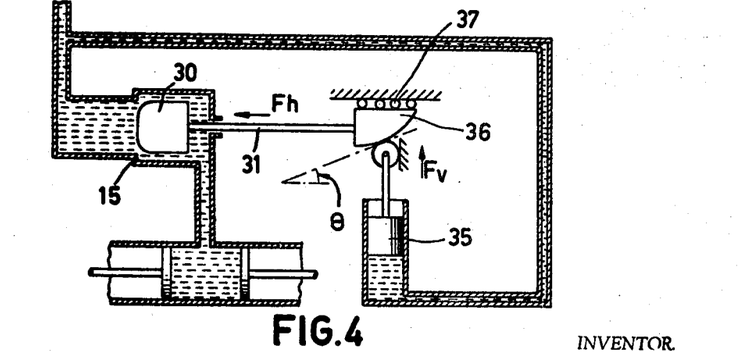
FIGURES 4 and 10 illustrate various anti-lock brake control devices according to the invention.

Thus the arrangement of FIGURE 4 is one wherein the second storage element is the master cylinder and a feedback coupling is provided which comprises a piston coupled with the feedback side of the force-balancing device and a hydraulic line from the master cylinder to said piston, the control piston being adapted to block flow of fluid from master cylinder to brake during anti-lock action.

Figure 6:
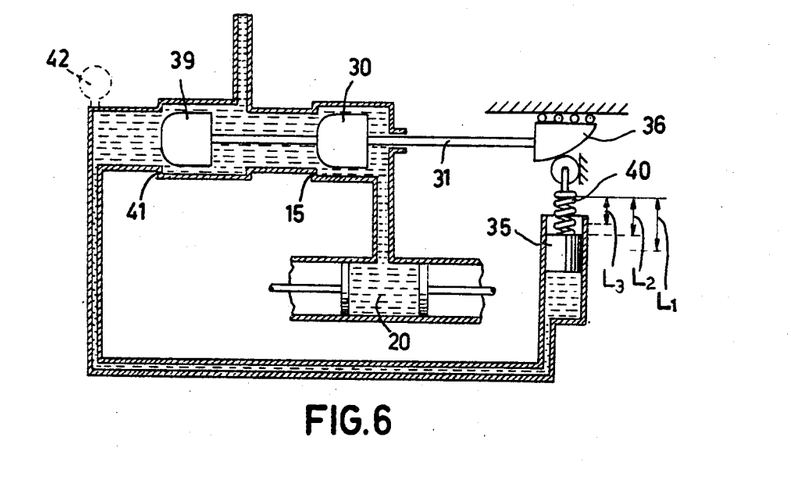
Figure 7:
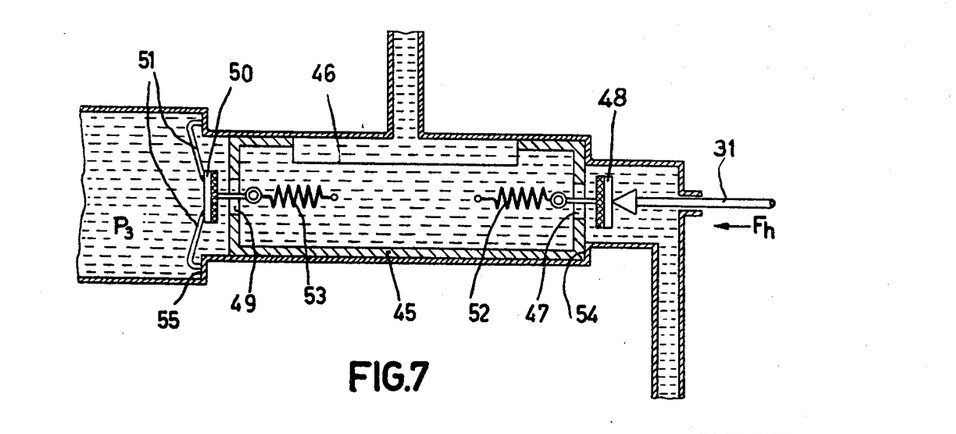
Figure 8:
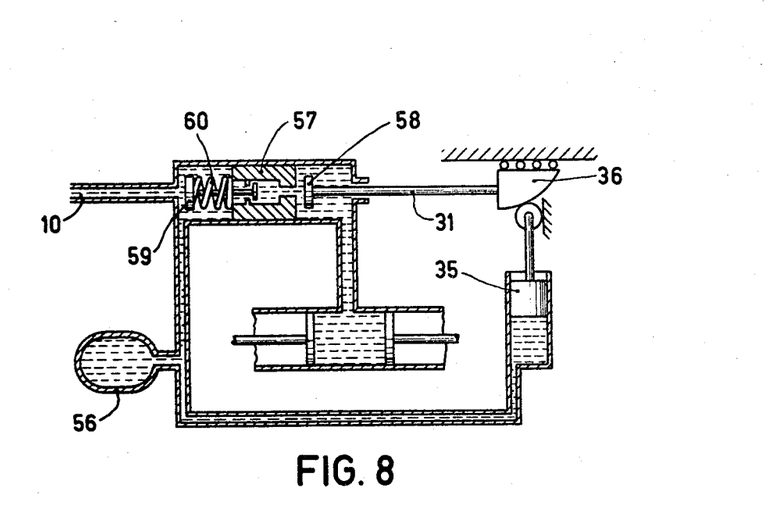

The arrangements of FIGURES 6 to 8 are such that the second storage element is independent of changes in master cylinder pressure during anti-lock action. Although independent during anti-lock action, the second storage element may, as described, be adapted to be adjusted by the prevailing master cylinder pressure in the absence of anti-lock action, said storage element being a resilient element located in a feedback coupling which coupling comprises a piston coupled with the feedback side of the force-balancing device and a hydraulic coupling from the control element to said piston.

Figure 5:
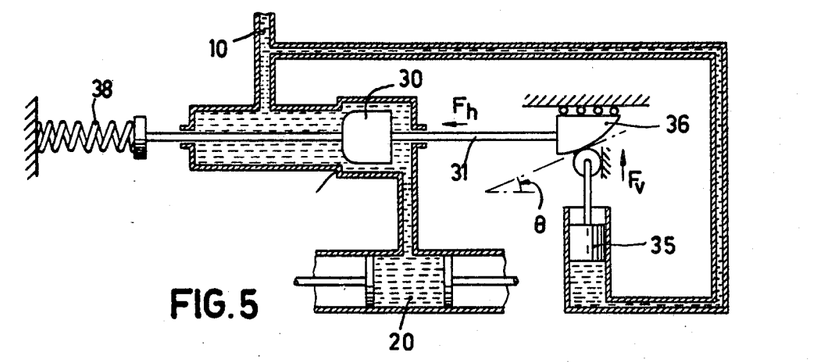
Figures 9, 10:
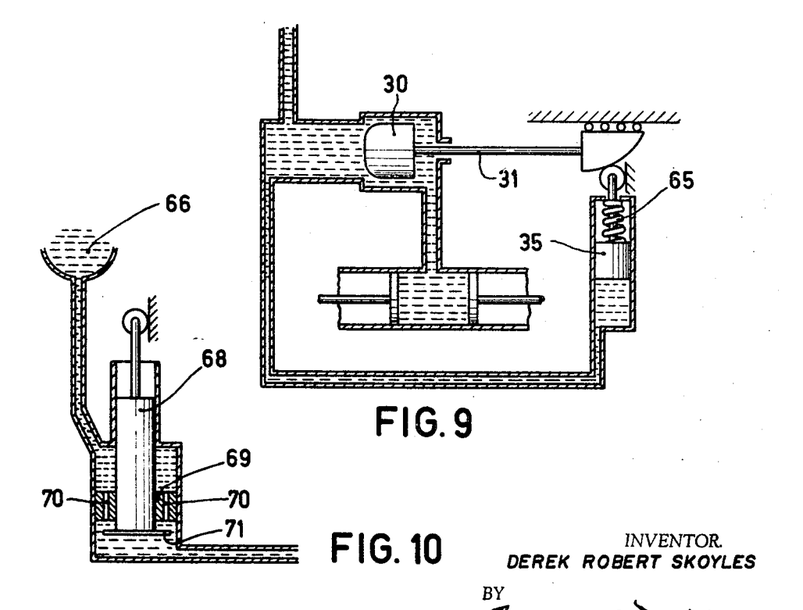

The arrangements of FIGURES 5 and 9 are such that the second storage element is constituted partly by the master cylinder and partly by a separate resilient element. In these two cases the separate resilient element is a spring which is independent of master cylinder pressure at all times.

Moreover the arrangement of FIGURE 9 is such that the said separate resilient element is a spring which is inserted in a feedback coupling in such manner as to be dependent on master cylinder pressure at all times, said coupling comprising a piston coupled with the feedback side of the force-balancing device and a hydraulic line from the master cylinder to said piston. Although the master cylinder of FIGURE 9 acts as part of the second storage element, it may momentarily cease, or nearly cease, to act in this manner at one critical pressure.

Having outlined certain features of the illustrated embodiments, the said embodiments will now be described by way of example with reference to the figures of the accompanying diagrammatic drawings wherein.

FIGURE 1 illustrates a basic anti-lock braking system. A hydraulic pressure fluid line 10 emanating from the master cylinder transmits pressurized fluid to a brake cylinder 23. The pressure is transmitted to brakes (not shown) by pistons 21 and 22. A control piston 30 is inserted in the pressure line and is actuated by an electromagnet or the like (not shown) which engages the control rod 31. The functioning of the electromagnet is controlled by a wheel deceleration sensor. This system is a direct acting system.

The reference to "compression" of the fluid needs explanation since hydraulic fluids are usually regarded as incompressible; the term includes also compression of all the associated mechanical components.

To explain the curves in greater detail, the full-line curve of FIGURE 2 represents the additional force which has to be applied to the piston in order to move it in the restricted bore against the master cylinder pressure. As drawn, the curve implies that the piston 30 is already in contact with the shoulder 15 at the origin of the graph. The full-line graph is also drawn on the simplified assumption that the control rod 31 has effectively no cross-sectional area. In practice, of course, the cross section of this rod cannot be neglected and the practical dotted curve starts at Fo so as to represent the additional force which is required in view of the action of the brake pressure on the cross section of the rod (this action diminishes in step with Fw). The distance Da represents the maximum distance through which the piston 30 must be moved in order to reduce sufficiently the pressure on the brakes to permit the wheel or wheels to accelerate thereby preventing wheel locking. The further distance Db corresponds to the condition in which the brakes have been completely released but there may be no need for the anti-lock system to proceed as far as that point. The curves of FIGURE 2 tend towards level Fm which corresponds to the product of the prevailing master cylinder pressure and the cross-sectional area of the piston 30.

FIGURE 3 is a dagram of the force Fw acting on the right-hand side of the piston 30 due to the prevailing brake pressure and its variation with movement of the piston 30 (the shaded area shown represents the energy stored in the brake). Neglecting Fo, this graph starts at a level about equal to Fm, which almost corresponds to the condition in which fluid at the prevailing master cylinder pressure still communicates (past the piston 30) with the brake cylinder 23. As the piston 30 is forced against the master cylinder to obtain anti-lock action, the aiding force Fw due to pressure in the brake cylinder reduces gradually as shown in FIGURE 3.

In the arrangement of FIGURE 4 (as in all cases) the first energy storage element is constituted by the natural resilience of the brake assembly, and the invention is applied to a hydraulic braking system of the master cylinder type, i.e. one which employs a piston and cylinder as a source of pressurized fluid. The term "master cylinder" is used to distinguish broadly from the continuously-pumped type of system, and the term refers to a cylinder in which a piston (not shown) is urged against a body of fluid to pressurize it. The master cylinder may, for example, be servo-assisted or directly actuated by the foot of the driver.

The arrangement of FIGURE 4 uses a control element and control piston 30 and a balancing force from a second or balancing piston 35. The balancing piston 35 is subject to pressure from the master cylinder and provides a constant force. A force-balancing device in the form of a cam 36 ensures that the horizontal force (Fh) necessary for anti-lock control is provided by the horizontal component of force from piston 35 (force Fv) at the cam and this balances the force acting on 30 due to master cylinder pressure.

As will be seen, control piston 30 only becomes effective when the control element or rod 31 has moved the piston up to the restricted bore provided by the shoulder 15. The piston 30 is moved to this position by an external force applying element such as an electromagnet, which applies a force to the control element 31 and control piston 30, see FIGURES 11 and 12.

At this point it should be noted that, although the force-balancing device is shown as a cam 36, the embodiments illustrated are not restricted to actual cams, but include also equivalent devices (e.g. lever systems). The common feature of all these devices being the controlled change of mechanical advantage according to a predetermined relationship. In the drawings a cam 36 which is confined on one side by rollers 37 and operates through 90° has been chosen as a convenient example. The shape of the cam is designed to provide a varying angle $\theta$ in a manner dictated by the condition:

$$F_h = F_v \tan \theta \tag{1}$$

Thus, little effort is required to push the piston 30 over to the left.

Fluid feedback to the master cylinder or to the foot of the driver is also reduced on anti-lock because a certain fraction of this pressurized fluid is used to raise piston 35. However, this embodiment cannot be used for wholly cancelling the force and fluid feedback for the following reasons.

Figure 4A:
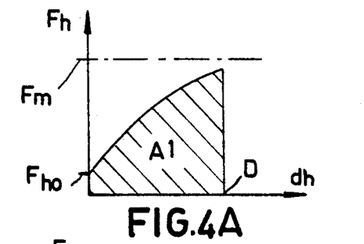
Figure 4B:
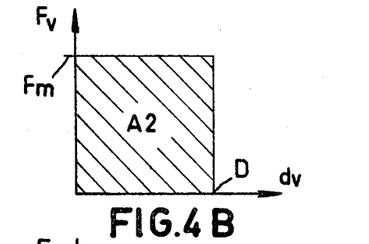

First, it will be convenient to refer to FIGURES 4A and 4B of the drawings. In FIGURE 4A a force F$h_o$ represents the small force which prevails on the piston 30 so long as it is not in contact with the step 15 in the bore, i.e. so long as fluid at master cylinder pressure can flow passed it to operate the brake 20. As the piston 30 is moved to the left under the influence of force F$h$ there comes a point where it contacts the step 15 and at that point it starts to reduce brake pressure, and this corresponds in FIGURE 4A to the start of the graph. As the movement proceeds the force F$h$ required, i.e. the force necessary to compensate for the decreasing force provided by the brake cylinder, increases gradually towards an upper level F$m$ which corresponds to the product of the master cylinder pressure and the area of piston 30. When this level is reached, the brake cylinder pressure will have been reduced to zero. The area A1 of this curve is shaded and represents the additional work done by the piston 30 for a movement D.

FIGURE 4B is the equivalent diagram for the balance piston 35. Here, the force applied on the piston can be assumed constant (this is because a master cylinder system is usually operated by foot pressure). Consequently, the work done by balance piston 35 for a given movement is represented by a rectangular area A2. The constant force has the same value (and is so shown) as the force F$m$ of FIGURE 4A if it is assumed (as is done below) that pistons 30 and 35 have equal areas.

The pistons 30 and 35 should have such movements $d_h$ and $d_v$ as to give the same swept volumes of fluid if feedback to the master cylinder (or the foot of the driver) is to be eliminated. This can be seen more easily by assuming that the cross-sectional areas of the two pistons are equal since in that case their movements must also be equal, and this assumption has been made in FIGURE 4A and FIGURE 4B by showing an equal movement D for both pistons in these figures.

However, if the movements D are made equal in order to prevent fluid feedback, the system is left with an area A1 which is smaller than A2 which means that more work is done by the vertical piston 35 than that needed by the horizontal piston 30 and the whole system would lock-over at distance D in favor of the vertical piston. In that case the anti-lock device would remain in operation, which is undesirable.

This inequality of areas A1 and A2 is related, of course, to the fact that the force on piston 35 is at most positions greater than the resultant force on piston 30 because (on the assumption made) their areas are equal and they are subjected to the same master cylinder pressure.

Figure 4C:
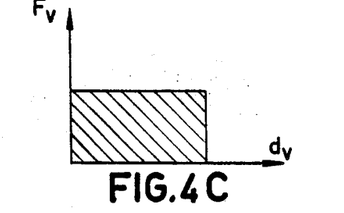
Figure 4D:
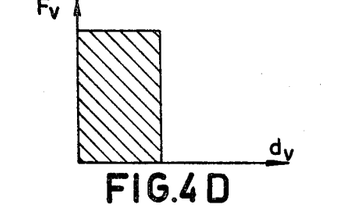

In order to render the work areas A1 and A2 equal so as to prevent lock-over, it is possible to either:

(a) reduce the area of piston 35 while maintaining the same stroke D; in this case the work diagram shows a smaller shaded area where the distance D is the same, but the height is reduced to a constant F$v$ value lower than F$m$ (see FIGURE 4C);

(b) reduce the stroke D of piston 35 while maintaining its piston area unaltered; in this case the work diagram shows a reduced shaded area where the distance D is reduced while the value of the force F$v$ is restored to value F$m$ (see FIGURE 4D).

In either case it is necessary to introduce a difference between the swept volumes of the two pistons and therefore some feedback to the foot of the driver is re-introduced.

It should also be noted that the feedback to the master cylinder is due basically to the fact that, in the embodiment of FIGURE 4, the master cylinder has a dual function, one of its purposes being to act as one of the two energy storage elements between which energy is transferred (the other storage element is, as aforesaid, the resilience of the brake assembly).

Where even reduced feedback is unacceptable, this can be overcome by using the arrangement of FIGURE 5. However, before passing to that figure, it is worth noting that, at every position along the strokes D of pistons 30 and 35, there is a change in the difference between the forces F$h$ and F$v$ operative on the two pistons. If this varying difference is reflected accurately in the design of the cam 36 (or equivalent) in accordance with the Equation 1 given above, then it is possible (apart from frictional losses) to move the piston 30 into the restricted bore (beyond 15) without much effort.

Referring now to the arrangement of FIGURE 5, this arrangement again comprises a control piston 30 which is adapted, during application of an anti-lock control force F$h$ thereto via a control rod 31, to tend to force fluid back to the master cylinder to release said brake assembly 20. An energy store 38 is provided in addition to the second piston 35 which is hydraulically coupled to the master cylinder connection 10 of the apparatus so as to develop a force which is fed back positively to said control elements 30 and 31 via a force-balancing cam 36. The energy store 38 acts against the control force F$h$.

The energy store 38 is indicated as a compression spring but it may, of course, be an equivalent device. Feedback to the master cylinder (i.e. to the driver's foot) can be eliminated by designing the cam profile in such manner that control piston 30 and balance piston 35 displace to each other all the fluid which would otherwise be forced back towards the master cylinder.

The force F$h$ necessary to move piston 30 to the left now has to be increased in order to overcome a rising force F$s$ due to the action of spring 38. This is indicated as a straight-line characteristic (assuming, for convenience, a constant stiffness of the spring) in FIGURE 5A. Assuming once more that the cross-sectional areas of the pistons 30 and 35 are equal, it is now possible to eliminate feedback to the master cylinder (or foot of the driver) by providing the spring 38 with sufficient stiffness that the sum of the work areas A1's due to the spring 38 (F$s$) and the control piston 30 (F$b$) is equal to the work area of balance piston 35 shown in FIGURE 5B.

Figure 5A:
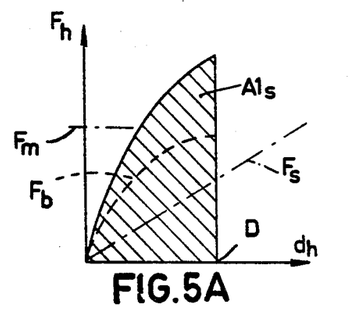
Figure 5B:
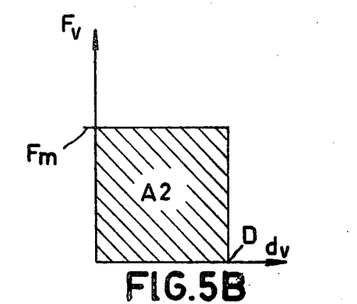

As will be seen from FIGURES 5A and 5B, the total work areas (shown shaded) are equal but it is necessary for both the forces and work areas to be balanced also at intermediate points along the strokes D of the two pistons. From the graphs it is not easy to see that this balance exists at some intermediate points, but it does in fact exist and the graphs must be interpreted on the basis that the distance scales of the two diagrams are not the same. For example, if the scale for one figure is linear, then the scale of the other diagram is non-linear, and this in turn is related to the fact that the cam 36 is non-linear, and there may be temporary feedback during the stroke.

Balancing of the control element 31 as indicated in FIGURE 5, can be done accurately for one particular master cylinder pressure only, but this limitation would not prevent some practical uses of the arrangement.

This limitation can be explained by reference to Equation 1 given above and also with reference to FIGURES 5A and 5B. A given cam design can balance the force F$v$ against the sum of the forces given on FIGURE 5A for any given value of D. However, if for example, the master cylinder pressure F$m$ is reduced to half, then the force F$b$ (of FIGURE 5A) will also be halved but the stiffness of the spring (F$s$) will remain the same and, as a result the ratio of the forces will no longer be the same.

This will be understood by considering the angle $\theta$. The tangent required for the cam (or equivalent) at any given point along the stroke will be $$\tan \theta = \frac{Fb + Fs}{Fv} \quad (2)$$

If, as aforesaid, the master cylinder pressure is halved, then the tangent required at the same point on the cam is $$\tan \theta = \frac{Fb/2 + Fs}{Fv/2} \quad (3)$$

As will be readily seen, this last angle $\theta$ has a different value from that given by Equation 2.

This difficulty can be overcome by using the arrangement of FIGURE 6.

In essence, the arrangement of FIGURE 6 can be regarded as being obtained by adding to the arrangement of FIGURE 5 means enabling the variations of master cylinder pressure to cause corresponding variations in the initial energy stored in the spring 38 or equivalent (the energy transferred to it on anti-lock is then substantially equal to the energy stored in the brake). If this is related to FIGURE 5A it will be seen that, although the slope of line $Fs$ must remain constant (because the stiffness of the spring is constant) the line $Fs$ can be raised so that its value is greater than zero at the origin under all braking conditions. The height of line $Fs$ can then be varied to maintain substantially equal the work areas A2 and A3 in spite of changes in master cylinder pressure.

This may be carried out in various ways. The particular arrangement of FIGURE 6 again comprises a first or control piston 30 which is adapted, during application of an anti-lock control force thereto via control rod 31, to tend to force fluid back to the master cylinder to release the brake assembly, and a second piston 39 in ganged relation to the control piston and adapted to displace all of the fluid so that none is fed back to the master cylinder. This second piston is coupled to a resilient energy store 40 constituting the other of the storage elements. The store 40 is adapted to develope a force which is fed back positively to the control elements 30 and 31 via the force-balancing device 36.

This arrangement operates by transferring all the energy stored in the brakes to the compressible resilient element 40, the latter being a compression spring coupled hydraulically to piston 39 via the piston 35, which here forms a third piston.

When the brake is applied normally there is no anti-lock action and fluid from the master cylinder passes the piston 30 to the brake 20 and passes the piston 39 to act on the balance piston 35 to compress the spring 40 from its naturally open length $L_1$ to a shorter length $L_2$. If the fluid pressures in the various parts are:

$P_1$ = master cylinder (10)
$P_2$ = brake space (20)
$P_3$ = at piston (35)

then, in these normal braking conditions, the piston assembly 30–39 is biased to the right by a force $$Fh = (P_3 = P_1 = P_2)As \quad (4)$$

where $A_s$ = shaft area i.e. cross-section of the control element 31. This presumes that the cam follower attached to balancing piston 35 acts on cam 36 in a manner to produce a horizontal component of $Fv$ less than $Fh$.

The anti-lock pistons 30 and 39 are moved to the left and first contact the restricted portions 15 and 41 of the fluid passages respectively; in their further movement since the pistons 30 and 39 have equal diameters no fluid is fed back to the master cylinder. The area ratio of pistons 30 and 39 and the shape of the cam 36 are such that the spring is further compressed to a length $L_3$.

Work done on the spring is then:

$$\frac{S'}{2}(2L_1 - L_2 - L_3)(L_2 - S_3) \quad (5)$$

and this is made equal to the work available from the brake (FIGURE 3) (here $S'$ is the stiffness or "rate" of the spring 40).

In this example the forces on rod 31 can be made to balance substantially at all positions of horizontal movement (and exactly at one master cylinder pressure) by adopting the correct cam shape, and almost no control effort is therefore needed. At the same time it is possible to ensure as aforesaid, that there is no feedback of fluid to the master cylinder.

Spring 40 can equally well be replaced by an expansion chamber at 42 in FIGURE 6 which is indicated in dotted lines as an optional alternative.

As a further variant, the hydraulic coupling between the pistons 39 and 35 of FIGURE 6 could be replaced by a mechanical coupling, e.g. a lever system.

The change of bore to a restricted diameter as shown at 15 or 41 is convenient in that it can be seen more clearly from the drawings that there is free flow of fluid past the piston or pistons so long as they lie in the wider bores.

However, in practice it may be preferable to use a constant bore with an annular recess housing, a flexible annular gland which projects inwardly from the bore and thus seals the gap round the respective piston when the latter reaches it. A further alternative is to provide in the wall longitudinal grooves which replace the parts having the wider bore.

Yet another alternative is to replace the pistons 30–39 by a single piston adapted to shut off the connection to the master cylinder during anti-lock operation. In fact, these pistons 30 and 39 may be regarded as a single piston which is shaped in a manner dictated by the restrictions 15 and 41 in the bore. In cases where such restrictions are not used, it is possible to adapt e.g. the equivalent arrangement shown in FIGURE 7 where the ganged pistons 30 and 39 are replaced by a hollow structure 45 with a longitudinal slot 46 in communication with the pressure line 10. The structure 45 has a port 47 in one end wall which can be sealed by a valve 48 and a port 49 in the other end wall which can be sealed by a valve 50. The valve 50 has retaining fingers or extensions 51 which catch on stop surfaces in the bore. The valves are biased by compression spring 52 and tension spring 53, and there are two steps or changes of diameter in the bore as shown at 54 and 55 which act as limit stops.

When anti-lock force $Fh$ is applied to control element 31, port 47 closes and the piston is driven over to the left. Pressure $P_3$ then builds up, thus closing port 49. When force $Fh$ is removed, pressure $P_3$ forces the piston over to the right until the shoulder 55 is met by extensions 51 of valve 50, whereupon fluid can flow from left to right. Valve 48 opens when the piston is fully over to right against step 54. In practice force $Fh$ is added to by the force from the cam 36 which prevents fluid from re-entering the brake until the piston is over to the right.

A variant of the arrangement of FIGURES 6 and 7 will now be described with reference to FIGURE 8 in which an expansion chamber 56 is used again in place of a spring and wherein a single piston 57 is arranged opposite the opening of the master cylinder connection 10. The piston has a bore which can be closed by a valve 58. Piston 57 also carried a spring valve 59 whose stem is held captive in the bore as shown.

The operation is as follows. On anti-lock, control rod 31 first closes valve 58 on to the bore in piston 57. The rod then forces the piston 57 to the left until the valve 59, biased by a weak spring 60, is moved to close the opening of the master cylinder connection 10. As soon as valve 59 is closed, pressure builds up in the energy storage member, the expansion chamber 56, and this chamber then holds the valve 59 closed. This rise in pressure is due ot the fact that the cam 36 is so designed that piston 35 makes a smaller movement than piston 57. The areas of the pistons 35 and 57 are assumed equal for convenience.

This is another case in which the forces on the cam 36 are increased owing to the presence of a spring or an expansion chamber. However, there is greater safety because (unlike the case of FIGURE 10 described later) any leakage from chamber 56 (e.g. past any of the valves or pistons) will not impede re-application of the brake when the control force ($Fh$) has been removed.

The operation will be better understood from FIGURES 8A–8B. In FIGURE 8A, the line $F2a$ at the top represents the force applied by chamber 56 on the left side of piston 57. The curve on the negative side of the graph represents the force due to the energy stored in the brake acting on the right side of piston 57; the difference between these forces is given by the curve which encloses the shaded work area A11. In FIGURE 8B the line $F2a$ represents, again the increasing force due to the "rate" of chamber 56 treated as equivalent to a spring. The area A12 is made equal to area A11 by making the strokes D1 and D2 of the two pistons unequal and tilting the line $F2a$ to obtain the same final force value $Fz$ for both graphs. The curves of FIGURE 8A are drawn so as to indicate that the brake is fully released on anti-lock, although this may not always be necessary.

The chamber 56 can be replaced by a spring which (like the spring 40 of FIGURE 6) is free from abutments and balance at the cam can be substantially complete over a wide range of master cylinder pressures.

Although the arrangements of FIGURES 5 to 8 make it possible to overcome various problems as explained, they all involve the application of increased forces on the cam 36. This can be obviated by an arrangement which will be described in one of its forms with reference to FIGURES 9 to 9C of the drawings.

The system of FIGURE 9 differs from that of FIGURE 4 in that the piston 35 has to compress a spring 65 (constituting the second energy storage element) against a fixed abutment. The effect of this will be explained first with reference to FIGURES 9A and 9B where (unlike the case of FIGURES 4A–4B) the tendency to lock-over is overcome by arranging that the excess energy represented by the difference between areas A1 and A2 (FIGURES 9A–9B) is diverted to the spring 65 so that the net energy available from piston 35 is as shown by the area A3 (equal to A1) of FIGURE 9C. This area is obtained by subtracting from A2 (which is the work done on the underside of balance piston 35) the work done by the spring on the upper side of the piston 35 and represented by the line $Fsf$. In these diagrams the limit force is again $Fm$ i.e. the product of brake pressure and piston area. The areas of pistons 30 or 35 are assumed equal for convenience.

Figure 9A:
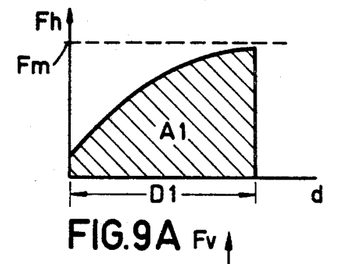
Figure 9B:
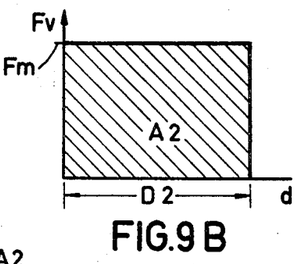
Figure 9C:
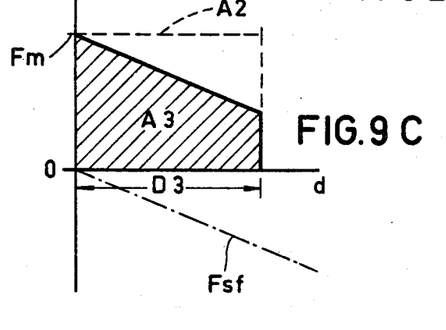

If the work areas A1 and A3 are equalized to prevent locking over as shown in FIGURES 9A–9C, it can be seen from the diagrams that, if the piston areas are equal, distances moved by the pistons are also equal.

In practice it is undesirable to use a spring in the manner shown as this would be correct for only one master cylinder pressure. Instead a resilient element can be used in such manner that its compression depends initially on the instantaneous brake pressure. For example, it is possible to use fluid in an expansion chamber 66 (FIGURE 10) which has a resilient wall, or alternatively, is fairly large because of the low compressibility of normal hydraulic fluids or oils (FIGURE 10 will be described more fully below).

Now work done by the two pistons is equal and their travel is also equal so that there is no feedback to the master cylinder. In practice the pistons need not be of the same area if the strokes are adjusted so that they still provide equal fluid displacement.

The cam is arranged to provide a force balance between the pistons as before but, in a practical layout, it may be preferable to slightly unbalance the forces (and work done) so that the broke always tends to go "on" unless a control force is applied to shift piston 30 to the left.

Referring now to FIGURE 10, which is a variant of FIGURE 9, this arrangement uses a composite piston 68–69 the two parts together having an area which is assumed equal to the piston area of the piston 30. Part 68 emerges from its cylinder and is exposed to atmospheric pressure. An enlarged part of the cylinder communicates with the fluid expansion chamber 66. The piston 68 rides in the bore of the ring piston 69 in which are formed several ducts 70 which can be closed by a disc valve 71 carried on the base of piston 68. This disc valve 71 can of course be replaced by a poppet valve or other equivalent and ducts 70 may be replaced by a continuous annular gap between the two pistons.

The arrangement operates as follows. When the brake is applied, the valve 71 is open and fluid from the master cylinder pressurizes the fluid in the chamber 66 up to master cylinder pressure. When the piston 30 is moved to the left by the control element 31, the piston 68 initially rises and thereby closes the valve 71 on to the ducts 70. Thereafter, with further movement of piston 30 to the left, the combined pistons 68 and 69 cause fluid in the chamber 66 to be further compressed to a pressure higher than the master cylinder pressure.

The solution of FIGURES 9 and 10 can be compared with the solution of FIGURE 5 in the following way. In the case of FIGURE 5 the control force $Fh$ (FIGURE 5A) has to be increased so as to raise area A1 to the value of area A2 (FIGURE 5B) and this is done by adding to $Fh$ the increasing force required to compress spring 38. By contrast, the arrangements of FIGURES 9 and 10 employ a spring or equivalent on the other piston (35 or 68–69) so that force $Fv$ is reduced and thereby area A2 is reduced to the value of A1 with consequent reduction of the stresses on the cam.

Having described several examples of anti-lock brake control arrangements, the means for actuating the control element or elements (e.g. rod 31 and piston 30 in the examples illustrated) will now be considered.

It may be desirable for the actuating means to be electromagnetic and therefore capable of relatively fast responses. This should be considered in relation to the fact that the distance through which the piston 30 (or equivalent) is made to travel can be very small and commensurate with the stroke of an electromagnet. The compactness that can be achieved with an electromagnet and the relatively small amount of power required to operate it makes it possible to use a separate electromagnet and control arrangement for each of the wheels to which the anti-lock system is applied. Thus the rear wheels can readily be given independent control and it is also possible to provide independent controls for all the wheels of the vehicle so that each control valve can be placed very close to the respective brake so as to minimize the volume of hydraulic fluid between a brake and its control element.

Figure 11:
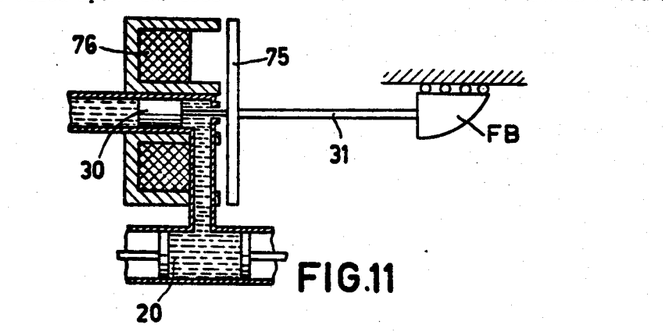
FIGURE 11 shows an electro-magnetic actuator suitable for use with such devices.

An example of an electromagnetic actuator is shown in FIGURE 11 where the control piston 30 is connected by control element 31 to an external armature 75 of magnetically permeable material which cooperates with a solenoid 76. As aforesaid, the movement of conventional brake shoes can be made small and hence the movement of a piston 30 of reasonable diameter can also be very small so as to suit the characteristics of the solenoid.

When solenoid 76 is energized the armature 75 is attracted and the piston 30 is thereby forced towards the left. This reduces pressure in the brake cylinder 20 so as to take the brakes off in spite of master cylinder pressure from the foot.

In an anti-lock application, an actuator such as that shown in FIGURE 11 is energized automatically in response to signals from a wheel deceleration sensor. In order to explain more fully the operation of such a system, a general layout is given in FIGURE 12 of the accompanying drawings which is a block schematic diagram showing a foot pedal 90 which actuates the piston of the master cylinder 91. The latter actuates (directly or via a servo) the wheel brake 92 via the anti-lock control unit 93, the unit includes a control piston (such as piston 30 of FIGURES 4 to 9) and an electromagnet, e.g., as described with reference to FIGURE 11.

Figure 12:
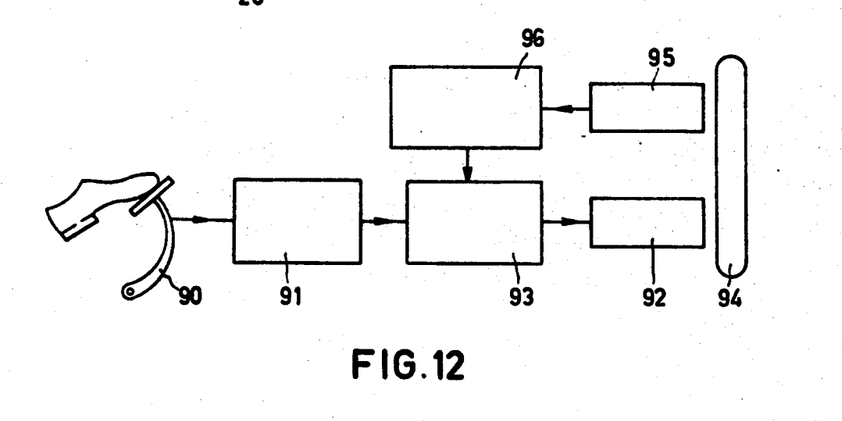
FIGURE 12 is a block-schematic circuit diagram of an anti-lock system.

Associated with the wheel 94 is a deceleration sensor 95 which applies signals to the electromagnet via a suitable signal processing circuit 96.

The signal processing can be done in various ways and according to various criteria. The simplest criterion (though not the ideal one) is for the sensor signals to be rendered effective or passed to the electromagnet only when the sensor registers a wheel deceleration which exceeds a predetermined value. This can readily be done with an electromagnetic sensor whose output has a voltage which is a function of deceleration, and a processing circuit which comprises a voltage threshold detector of known type followed by a suitable amplifier. Since such circuit elements are well known in the art, more detailed examples are not considered necessary.

Electromagnetic deceleration sensors are also known (deceleration being an obvious equivalent of acceleration from the point of view of sensing). However, an example of a suitable sensor will be described with reference to FIGURES 13 and 14 of the accompanying drawings.

Figure 13:
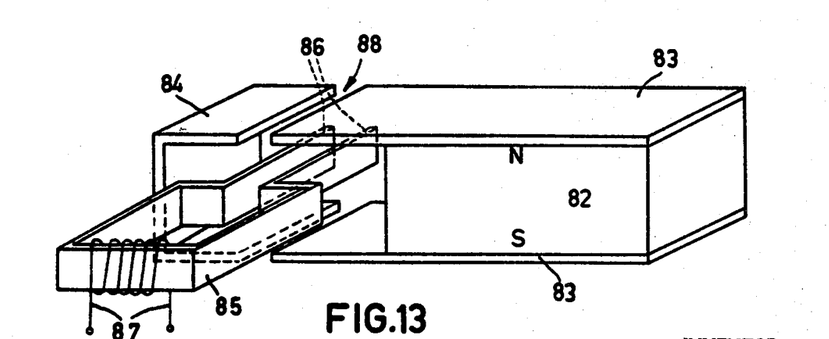
FIGURES 13-14 illustrate a wheel deceleration sensor.
Figures 14, 15A, 15B:
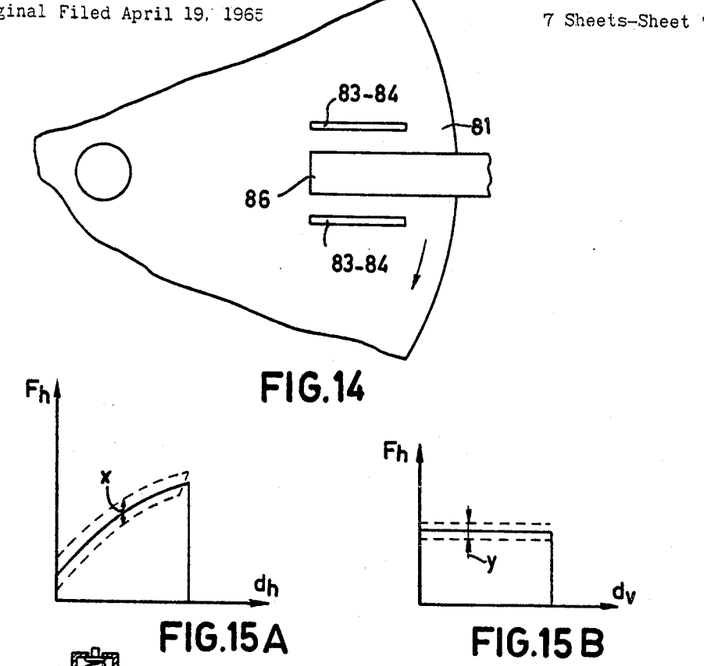
FIGURES 15A and 15B illustrate hysteresis effects.
Figure 16:
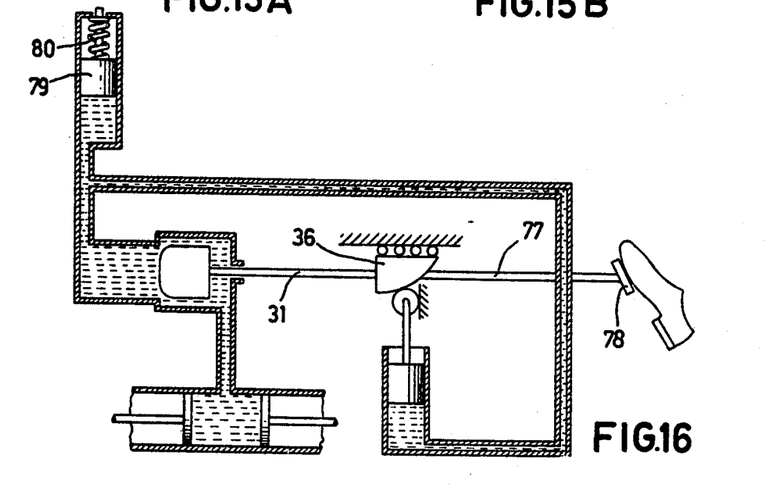

Referring to FIGURES 13 and 14, a conductive rotor in the form of a metal disc 81 of copper or aluminum is secured to the shaft or wheel whose deceleration is to be measured. The stator includes a primary magnet including a permanent magnet 82 between pole plates 83 on one side of the disc. This magnet is completed on the other side by a member 84. As the disc rotates with its edge in the gap indicated by arrow 88 eddy currents are induced in a peripheral part thereof by the poles 83.

The stator comprises secondary means in the form of a permeable magnet 85 having pole pieces 86 located centrally between the pole pieces 83 and 84 in such manner that any change in the eddy currents due to change in disc speed will induce a voltage in a pick-up coil 87 wound on the element 85. If the dimensions and values are correctly chosen the voltage at the output terminals of coil 87 may be made substantially proportional to deceleration (or acceleration) of the disc 81 within the required range of low speeds, although this may not be necessary in an anti-lock system.

The description given above of the cam 36 or its equivalent and its function was based on simplified considerations. In a practical brake there is hysteresis due to drag and friction losses. Taking, for example, FIGURES 4A and 4C, these losses have the effects shown in FIGURES 15A and 15B, i.e., the control force $Fh$ needed to move the piston 30 is increased for its movement into the bore 15 (i.e., to the left for anti-lock) and reduced for its outward or return movement (for return to normal). This difference is indicated as $x$ in FIGURE 15A.

In a similar manner the force $Fv$ associated with piston 35 is greater when the piston is moving into its bore (i.e., downwards) and smaller when it moves out, this difference being indicated as $y$ in FIGURE 15B.

In a practical cam design it is the forces appertaining to the return movements of the pistons (i.e., piston 30 outwards and to the right and piston 35 inwards and down) which have to be balanced since safety considerations require that the anti-lock control action should readily cease (as soon as the operative wheel sensor signals cease) so as to permit re-application of the brakes. Thus the actuator of the control elements (e.g., the electromagnet of FIGURE 11) has to supply a total force equal to the sum $(x+y \tan \theta + b)$ where $b$ is the fail-safe bias force used to bias the control elements 30 and 31 to their normal (non-anti-lock, i.e., inoperative) position in the absence of appropriate sensor signals.

The above cited embodiments are intended as exemplary only, and while I have described my invention with a specific application and embodiment thereof, other modifications will be apparent to those skilled in the art without departing from the spirit and scope of the invention as defined by the appended claims.

What I claim is:

1. An anti-lock apparatus for a vehicle braking system comprising a master cylinder for pressurizing a fluid; a brake operating cylinder; a first fluid passage interconnecting said master cylinder and said brake operating cylinder; means for regulating fluid communication between said master cylinder and said brake operating cylinder and for reducing the fluid pressure in said brake operating cylinder when brake-lock occurs; means for determining brake-lock; means for applying an external control force to reduce fluid pressure in said brake operating cylinder after brake-lock is determined coupled to said means for regulating fluid communication between said master cylinder and said brake operating cylinder and to said means for determining brake-lock; and means for applying pressurized fluid from said brake operating cylinder to said means for regulating fluid communication between said master cylinder and said brake operating cylinder for reducing the magnitude of external control force applied to reduce fluid pressure in said brake operating cylinder.

2. An anti-lock apparatus for a vehicle braking system according to claim 1 further comprising force balance means for applying pressurized fluid from said master cylinder to reduce the magnitude of external control force necessary to reduce the pressure in said brake cylinder.

3. An anti-lock apparatus for a vehicle braking system according to claim 2 wherein: said means for regulating fluid communication between said master cylinder and said brake operating cylinder and for reducing fluid pressure in said brake operating cylinder comprises a movable control piston located in said first fluid passage between said master cylinder and said brake operating cylinder and said control piston is actuated by said external control force applying means.

4. An anti-lock apparatus for a vehicle braking system according to claim 3 wherein: said first fluid passage includes a shoulder thereby defining a large diameter portion and a small diameter portion, said movable control piston is normally positioned in said large diameter portion thereby permitting fluid communication between said master cylinder and said brake operating cylinder, said piston being movable into said small diameter portion for terminating fluid communication between said master cylinder and said brake operating cylinder and for reducing pressure in said brake cylinder when actuated by said external control force applying means.

5. An anti-lock apparatus for a vehicle braking system according to claim 3 wherein: said force balance means comprises a cam coupled to said control piston, a cam follower engaging said cam, a balance piston coupled to said cam follower and a second fluid passage intersecting said first fluid passage, said balance piston being positioned in said second fluid passage in fluid communication with said master cylinder, said piston and said cam follower normally acting on said cam to position said control piston in said first fluid passage to maintain fluid communication between said master cylinder and said brake operating cylinder; and said piston and said cam follower acting on said cam to move said control piston to expand the volume of fluid acting on the brake operating cylinder after said external control force applying means has moved said control piston into position to terminate fluid communication between said master cylinder and said brake operating cylinder.

6. An anti-lock apparatus for a vehicle braking system according to claim 4 wherein: said force balance means comprises a cam coupled to said control piston; a cam follower engaging said cam; a balance piston coupled to said cam follower, and a second fluid passage intersecting said first fluid passage said balance piston being positioned in said second fluid passage in fluid communication with the master cylinder; said piston and said cam follower normally acts on said cam to position said control piston in said large diameter portion of said first fluid passage to maintain fluid communication between said master cylinder and said brake operating cylinder; and after said external control force applying means has moved said control piston into position to terminate fluid communication between said master cylinder and said brake operating cylinder said piston and said cam follower acts on said cam to move said control piston into said smaller diameter portion of said first fluid passage thereby reducing the pressure of the fluid acting on said brake operating cylinder.

7. An anti-lock apparatus for a vehicle braking system according to claim 6 further comprising means to limit fluid feedback to said master cylinder caused by movement of said control piston in said small diameter portion of said first fluid passage.

8. An anti-lock apparatus for a vehicle braking system according to claim 7 wherein: said means to limit fluid feedback comprises a spring coupled to said control piston to oppose movement of said control piston by said force balancing means; and said control piston and said balance piston are of equal diameter.

9. An anti-lock apparatus for a vehicle braking system according to claim 7 wherein: said means to limit fluid feed-back comprises a second piston in ganged relation to said control piston, positioned adjacent said second fluid passage; said second fluid passage includes a large diameter portion and a small diameter portion; said second piston sweeping a volume of fluid into the small diameter portion of said second passage equal to the volume of fluid swept by said control piston when said control piston is moved into said small diameter portion of said first passage, said second piston terminating fluid communication between said master cylinder and said balance piston when said second piston moves into said small diameter portion of said second passage.

10. An anti-lock apparatus for a vehicle braking system according to claim 9 wherein: said means to limit fluid feed-back further comprises a resilient energy storage member mounted in the second fluid passage, said energy storage member adapted to absorb energy from the pressurized fluid from said master cylinder.

11. An anti-lock apparatus for a vehicle braking system according to claim 10 wherein: said energy storage member is a compression spring interposed between said balance piston and said cam follower.

12. An anti-lock apparatus for a vehicle braking system according to claim 5 wherein: said control piston comprises a hollow cylindrical shell having a first aperture through one wall permitting fluid communication with said master cylinder, a second aperture through one wall permitting fluid communication with said brake operating cylinder and a third aperture through one wall permitting fluid communication with said balance piston; a first valve and interconnected to said force balance means and said external control force applying means, positioned adjacent said second aperture, said first valve for terminating fluid communication between said master cylinder and said brake operating cylinder; and a second valve connected to said cylindrical shell and positioned adjacent said third fluid aperture, said second valve for terminating fluid communication between said balance piston and said master cylinder, wherein the application of an external control force closes said first valve and moves said control piston thereby reducing pressure in said brake cylinder, and said control piston movement closes said second valve thereby eliminating the passage of displaced fluid into the master cylinder.

13. An anti-lock apparatus for a vehicle braking system according to claim 7 wherein: the outer surface of said control piston is in sealing contact with said first fluid passage and said control piston includes an aperture therethrough; said external control force applying means includes a valve member positioned adjacent one end of said aperture on said control piston; said fluid feed-back limiting means comprises a valve means interposed between said control piston and said master cylinder; and the movement of said external control force applying means places said valve member into contact with said control piston wall surrounding said aperture thereby terminating fluid communication between said master cylinder and said brake operating cylinder and moves said control piston with said movement of said control piston actuating said valve means thereby terminating fluid communication between said master cylinder and said balance piston.

14. An anti-lock apparatus for a vehicle braking system according to claim 13 wherein: said fluid feed-back limiting means further comprises a resilient energy store means interposed in said second fluid passage.

15. An anti-lock apparatus for a vehicle brake system according to claim 3 further comprising: means for eliminating lock-over of said control piston by the action of said force balance means.

16. An anti-lock apparatus for a vehicle brake system according to claim 7 further comprising: means for eliminating lock-over of said control piston by the action of said force balance means.

17. An anti-lock apparatus for a vehicle brake system according to claim 16 wherein: said means for eliminating lock-over of said control piston comprises a piston, and a resilient energy absorber interposed between said balance piston and said cam; said energy absorber absorbs a predetermined amount of energy from said pressurized fluid emanating from said master cylinder and acting on said balance piston whereby the transfer of energy by said force balance means is limited.

18. An anti-lock apparatus according to claim 17 wherein: said resilient energy absorber comprises an abutment means positioned between said balance piston and said cam, and a spring interconnecting said balance piston and said abutment means, wherein a portion of the energy being transmitted to said cam by said balance piston is transferred to said spring.

19. An anti-lock apparatus for a vehicle brake system according to claim 3 wherein: said external control force applying means comprises a solenoid and an armature, wherein actuation of said solenoid and armature by said sensor means actuates said control piston.

20. An anti-lock apparatus for a vehicle brake system according to claim 16 wherein: said external control force applying means comprises a solenoid and an armature, wherein actuation of said solenoid and armature by said sensor means actuates said control piston.

21. An anti-lock apparatus for a vehicle brake system according to claim 3 wherein: said sensor means for determining brake-lock comprises means for determining wheel deceleration and means to actuate said external control force applying means.

22. An anti-lock apparatus for a vehicle brake system according to claim 21 wherein: said means for determining wheel deceleration comprises a metal disc rotor adapted to be attached to a wheel of a vehicle; a stator including a magnet and a pair of pole plates positioned on opposite sides of said magnet, a member in opposed spaced relation to said pole plates and said magnet; a secondary stator means comprising a permeable magnetic element having a pair of pole pieces, said pole pieces being positioned in said space with said disc rotor being positioned to rotate therebetween, and a pick-up coil surrounding said permeable magnetic element, whereby variation in the speed of rotation of said rotor induces a voltage in said pick-up coil.

References Cited

UNITED STATES PATENTS 2,868,338   1/1959   Lucien et al.
3,110,522   11/1963   Bunch _____________ 303—49 X DUANE A. REGER, *Primary Examiner.*